United States Patent
Garza, Jr. et al.

(10) Patent No.: US 10,843,278 B2
(45) Date of Patent: Nov. 24, 2020

(54) KAMMPROFILE MILLING MACHINE

(71) Applicant: LGC US ASSET HOLDINGS, LLC, Houston, TX (US)

(72) Inventors: Armando Garza, Jr., Houston, TX (US); Albert Wright Genther, Dayton, TX (US); Brian Edward McGehee, Houston, TX (US); Jerel T. Rumbley, Pearland, TX (US)

(73) Assignee: LAMONS GASKET COMPANY, Houston, TX (US)

( * ) Notice: Subject to any disclaimer, the term of this patent is extended or adjusted under 35 U.S.C. 154(b) by 0 days.

(21) Appl. No.: 16/190,424

(22) Filed: Nov. 14, 2018

(65) Prior Publication Data

US 2019/0151962 A1    May 23, 2019

Related U.S. Application Data

(60) Provisional application No. 62/587,642, filed on Nov. 17, 2017.

(51) Int. Cl.
*B23C 3/00* (2006.01)
*B23C 1/025* (2006.01)
(Continued)

(52) U.S. Cl.
CPC ............... *B23C 3/34* (2013.01); *B23C 1/025* (2013.01); *B23C 3/002* (2013.01); *B23C 3/04* (2013.01); *B23Q 3/002* (2013.01); *B23Q 3/005* (2013.01); *B23Q 11/0085* (2013.01); *B23Q 11/0891* (2013.01); *B23Q 15/013* (2013.01);
(Continued)

(58) Field of Classification Search
CPC ... Y10T 409/305432; Y10T 409/30532; Y10T 409/306104; Y10T 409/306048; Y10T 409/305656; Y10T 409/305208; Y10T 409/309128; Y10T 409/304144; Y10T 409/309072; Y10T 409/30392; B23C 3/34; B23C 3/04; B23C 3/002; B23Q 7/05;
(Continued)

(56) References Cited

U.S. PATENT DOCUMENTS 5,921,729 A * 7/1999 Kikuchi .................... B23C 1/04
409/138
6,823,579 B2 * 11/2004 Veiga ..................... B65H 18/28
29/33 D
(Continued)

FOREIGN PATENT DOCUMENTS

CN    203526657 U  *  4/2014
CN    106270683 A  *  1/2017
(Continued)

OTHER PUBLICATIONS

Machine Translation of KR-10-2014-0008799-A, which KR '799 was published Jul. 2014.*
(Continued)

*Primary Examiner* — Erica E Cadugan
(74) *Attorney, Agent, or Firm* — David G. Henry, Sr.

(57) ABSTRACT

An automatic milling machine mills a gasket. The automatic milling machine controls the position of a cutter head relative a table. The automatic milling machine rotates the gasket with a motor. Parameters of the motor are monitored to determine the amount of rotation of the gasket.

16 Claims, 8 Drawing Sheets

(51) Int. Cl.
*B23Q 3/00* (2006.01)
*B23Q 11/08* (2006.01)
*B23Q 11/00* (2006.01)
*B23Q 15/013* (2006.01)
*B23Q 17/00* (2006.01)
*B23C 3/34* (2006.01)
*B23C 3/04* (2006.01)
*F16J 15/00* (2006.01)
*G05B 19/401* (2006.01)
*F16J 15/06* (2006.01)
*F16J 15/12* (2006.01)
*F16L 23/18* (2006.01)
*F16J 15/02* (2006.01)

(52) U.S. Cl.
CPC ........ *B23Q 17/007* (2013.01); *B23C 2220/40* (2013.01); *F16J 15/022* (2013.01); *F16J 15/064* (2013.01); *F16J 15/122* (2013.01); *F16L 23/18* (2013.01); *G05B 19/401* (2013.01); *Y10T 409/30392* (2015.01); *Y10T 409/304648* (2015.01); *Y10T 409/305208* (2015.01); *Y10T 409/305432* (2015.01); *Y10T 409/305656* (2015.01); *Y10T 409/309072* (2015.01); *Y10T 409/309128* (2015.01)

(58) Field of Classification Search
CPC ................... B23Q 7/055; B23Q 15/12; B23Q 11/08–11/0891
USPC ....... 409/161, 159, 173, 172, 165, 157, 138, 409/227, 226, 80, 134; 700/159–194
See application file for complete search history.

(56) References Cited

U.S. PATENT DOCUMENTS 10,207,311 B2 * 2/2019 Barozzi ................. F16J 15/125
2013/0223946 A1 * 8/2013 Yamamoto ........... G05B 19/404
  409/80
2015/0308176 A1 * 10/2015 Oda ........................ E05F 15/40
  49/31
2015/0323923 A1 * 11/2015 Takabe ..................... B23C 3/28
  700/186

FOREIGN PATENT DOCUMENTS

| CN | 106271809 A | * | 1/2017 |
| CN | 206717101 U | * | 12/2017 |
| CN | 206717102 U | * | 12/2017 |
| CN | 206794857 U | * | 12/2017 |
| CN | 207534431 U | * | 6/2018 |
| CN | 208195765 U | * | 12/2018 |
| CN | 208913213 U | * | 5/2019 |
| CN | 208913217 U | * | 5/2019 |
| CN | 210677077 U | * | 6/2020 |
| JP | 07-009229 A | * | 1/1995 |
| KR | 10-2014-0008799 A | * | 7/2014 |

OTHER PUBLICATIONS

Machine Translation CN 203526657-U, which CN '657 was published Apr. 2014.*
Machine Translation CN 106271809-A, which CN '809 was published Jan. 2017.*
www.heroos.com. "Automatic Machines for Camprofile/Kammprofile Gasket"; accessed as of Jul. 27, 2017; http://www.heroes.com/English/Product/4963074029.html.
www.suzhoumate.com. "MK-03 Kammprofile Machine"; accessed as of Jul. 27, 2017; http://www.suzhoumate.com/en/product_show.asp?ncid=93.

* cited by examiner

KAMMPROFILE MILLING MACHINE

CROSS-REFERENCE TO RELATED APPLICATION

This application claims priority to U.S. Provisional Patent Application No. 62/587,642 entitled "KAMMPROFILE MILLING MACHINE," filed on Nov. 17, 2017, which is incorporated herein by reference in its entirety.

FIELD OF INVENTION

The present invention relates to a milling machine, and in particular, an automated kammprofile gasket milling machine.

BACKGROUND

A kammprofile gasket is produced from a machined substrate. This kammprofile gasket incorporates small machined grooves on the sealing surfaces which do not allow for any noticeable deflection in the core and therefore do not contribute to compressibility. Kammprofile gaskets are recognized as a problem solver for heat exchangers, large vessels, and equipment that experience excessive movement due to thermal expansion. The kammprofile provides one of the tightest seals combined with superior load bearing characteristics. Kammprofile gaskets consist of a sealing core metal with or without a guide ring. The sealing core is a solid metal gasket with concentric serrations on both sealing surfaces and faced with soft material such as flexible graphite, EPTFE, or the HTG configuration depending on operating conditions. It is the preferred design when needing improved performance at low seating stresses. The simultaneous actions of a high compressibility facing material on the outside of the grooved metal in combination with limited penetration of the tips of the solid metal core enhance the interaction of the two materials. This allows the component to perform individually to their optimum capabilities.

In some traditional systems, kammprofile gaskets are milled with an operator manually controlling the positioning of the gasket on a machine. The operator must manually adjust for the depth of a cut, thickness of a gasket, and diameter of the gasket. Moreover, the operator may be required to physically turn or revolve the gasket. Some lathe-style machines may make single cuts in a gasket at a time. These types of machines take time to operate as kammprofile gaskets require several cuts.

It would be beneficial to automatically mill a gasket. Moreover, a more accurate, efficient, and improved method of milling a gasket is desirable.

BRIEF DESCRIPTION OF THE DRAWINGS

The accompanying drawings illustrate various systems, apparatuses, devices and related methods, in which like reference characters refer to like parts throughout, and in which.

DETAILED DESCRIPTION

Reference will now be made to exemplary embodiments, examples of which are illustrated in the accompanying drawings. It is to be understood that other embodiments may be utilized, and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" mean an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

While embodiments and examples describe an automated milling machine for milling of kammprofile gaskets, it is noted that the systems, apparatuses, and methods described herein may be applied to a variety of applications, including milling of other types of gaskets or components. Furthermore, gaskets may comprise different materials such as metals and alloys. In addition, the terms "workpiece," "blank," "gasket," or the like may be used interchangeably throughout this disclosure unless a particular distinction is made or context suggests otherwise. Such terms refer to a piece of material that is to be milled. As an example, a blank may refer to a piece that has not been milled, is partially milled, or the like. For instance, examples may refer to milling a blank where one side of the blank has ribs formed therein while the other side is blank.

In traditional kammprofile milling machines, users must manually align a part to be milled and manually adjust positions of components of the kammprofile milling machine. In an example, the user places the blank on a table and then uses a series of cranks or wheels to manually position the blank and table. This often involves adjusting the position of the table on both the y-axis and the z-axis. The user may have to adjust the position of a milling or cutter head to control the depth of a cut, manually clamp the workpiece, manually turn the workpiece, or perform other manual adjustments. For instance, the user must perform one cut, then must reset or adjust the machine for another pass. Typically, the user makes three passes or cuts to reach a desired depth. This process is often tedious and time consuming. Moreover, there are several opportunities for users to make mistakes in the fabrication process. Lathe style machines provide a single cut on a blank. They may spin a gasket with a motor but have several short comings as these machines must make several passes to complete a single layer of cuts.

In disclosed embodiments, an automated kammprofile milling machine may automatically adjust the position of components, control a cutter head, and mill a blank. According to examples, a user may place a blank on the mill table and the machine may control one or more motors to appropriately position the table. The machine may position a cutter head and may control one or more rollers to translate the blank about the table as it is milled. Embodiments may increase efficiency of kammprofile milling, decrease errors in production, and provide for more accurate kammprofile gaskets.

A described embodiment includes an automatic milling machine comprising, a controller, a cutter head for milling a kammprofile gasket and operatively controlled by the controller, a table operatively supporting a workpiece, and a driving motor that operatively moves the workpiece relative the cutter head, wherein the controller operatively monitors the relative position of the cutter head and the table, and adjusts the relative position based at least in part on operation of the driving motor. The automatic milling machine may comprise a user interface coupled to the controller, wherein the user interface receives dimensions of a workpiece. In an aspect, the user interface may comprise a touch screen monitor. The controller may adjust the relative position based at least in part on operation of the driving motor and the dimensions of the workpiece. The controller operatively adjusts the relative position by moving the table in one or more axes. The controller operatively adjusts the relative position by moving the cutter head in one or more axes. The automatic milling machine may include a safety guard disposed proximal the cutter head. The controller operatively adjusts the position of the safety guard based on a state of the automatic milling machine. The automatic milling machine may further comprise a manual control that manually adjusts the relative position of the table. In at least one embodiment, the automatic milling machine may comprise at least one of a front roller, a back roller or a theta roller. The controller operatively positions at least one of the front roller, the back roller or the theta roller to operatively clamp the workpiece. The automatic milling machine may further comprise a theta motor operatively driving the theta roller.

Also described is an automatic milling machine comprising a controller comprising a processor, a cutter head and a cutting head motor, wherein the controller operatively controls the cutter head to mill a kammprofile gasket, a table and a table motor, wherein the table motor operatively positions the table and wherein the table operatively supports a workpiece, one or more front rollers and one or more back roller that are rotatable about an axis, wherein at least one of the one or more front rollers or the one or more back rollers are movable along another axis to clamp the work piece, and a theta roller and driving motor that operatively rotate the workpiece to pass the workpiece along the cutter head, wherein the controller operatively monitors the relative position of the cutter head and the table, and adjusts the relative position based at least in part on operation of the driving motor. The controller operatively determines the amount of revolutions of the workpiece based on operation of the driving motor. The controller operatively controls the driving motor and the cutting head to make at least two cutting passes on the workpiece.

A method of milling a gasket is described. The method may include receiving, by a milling system, characteristics associated with a workpiece to be milled; adjusting, by the milling system, the relative position of a cutter head and a table that supports the workpiece; rotating, by the milling system, the cutter head to cut the workpiece; monitoring, by the milling system, rotation of the cutter head; and determining, by the milling system, whether to iterate adjusting the relative position based at least in part on monitoring the rotation and the characteristics associated with the workpiece. The method may further comprise cutting a plurality of grooves at the same time. The method may further comprise adjusting the relative position of the cutter head and the table, comprises driving a motor to adjust the position of the table. The characteristics of the workpiece comprise at least one of a diameter or a thickness.

Figure 1:
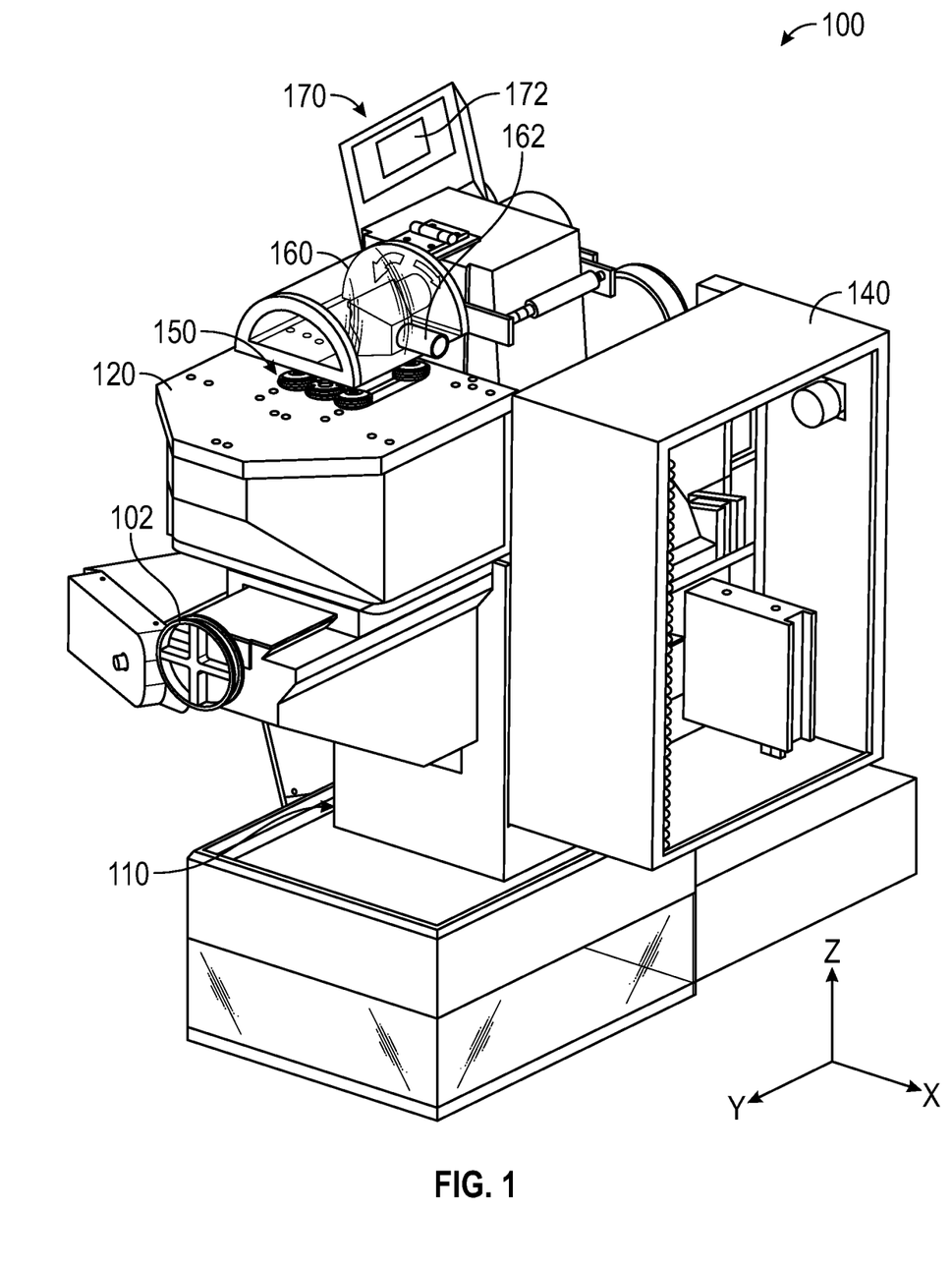
FIG. 1 is a side, perspective view of an automatic gasket milling machine in accordance with embodiments disclosed herein.
Figure 2:
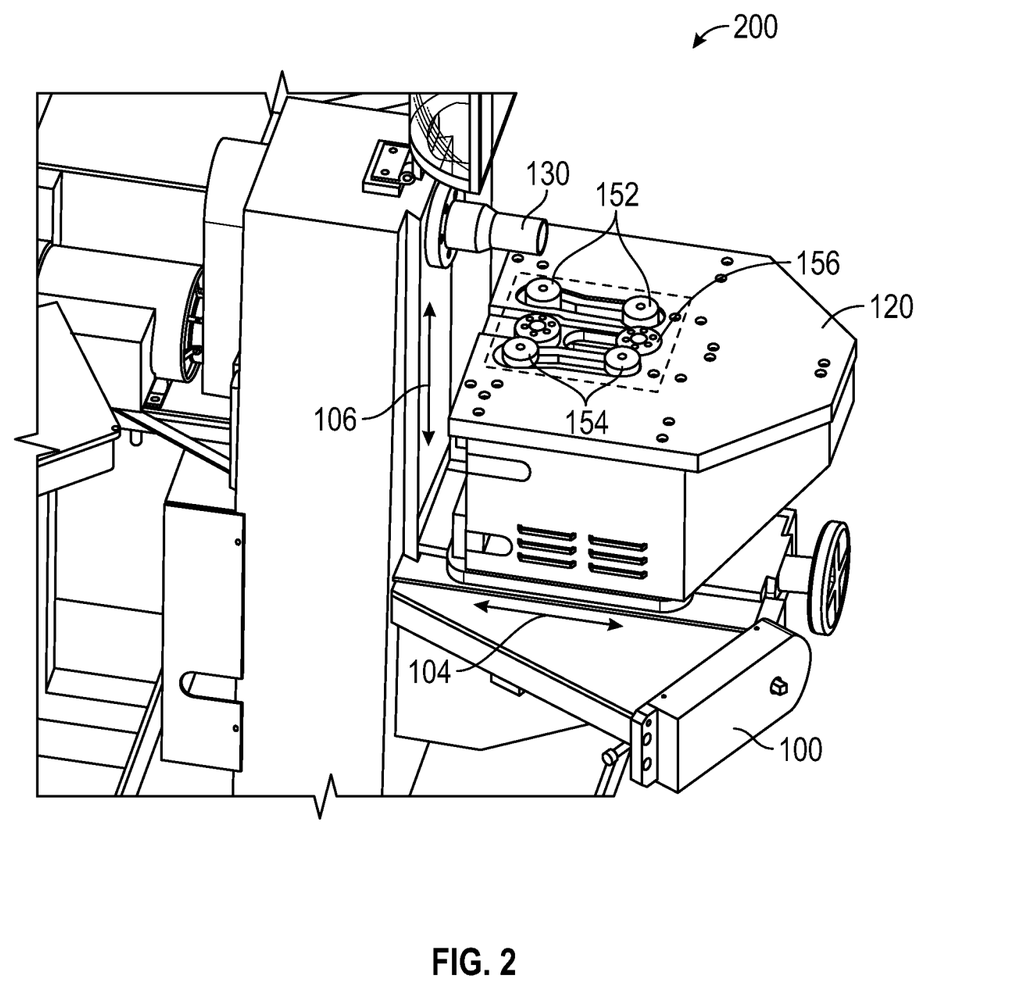
FIG. 2 illustrates an enlarged view of a cutter head and table of the machine of FIG. 1 in accordance with embodiments disclosed herein.

Turning now to FIGS. 1-2, there is an automated milling machine 100 according to various disclosed aspects. The machine 100 may operatively accept a workpiece and may automatically mill the workpiece according to desired specifications. For example, the machine 100 may accept a metal workpiece that is to be milled to form a kammprofile gasket.

The machine 100 may primarily comprise a base 110 that may support a table 120, a cutter head 130, and a controller 140. In operation, the user may place a workpiece on the table 120 and the controller 140 may automatically move the table 120 into an appropriate position for the cutter head 130 to cut the workpiece. As described in more detail herein, the controller 140 may adjust the position of the table in one or more directions of a coordinate plane, such as in the y-axis, x-axis, or z-axis. It is noted that machine 100 may automatically control the position of the table in one or more axes and may provide for manual control in one or more other axes. Moreover, the machine 100 may allow a user to override automatic positioning with a manual control.

According to an exemplary embodiment, the machine 100 may include a manual control 102 that may allow a user to manually adjust a position of the table 120. The manual control 102 may, for instance, comprise a crank that a user may rotate to move the table 120 in the positive or negative y-direction. It is noted that manufacturing of kammprofile gaskets may not require repeated adjustment in the y-direction. Thus, the machine 100 may include the manual control 102 in the y-direction while providing automatic control of movements in other directions. This may reduce the manufacturing cost of the machine 100 and/or may simplify the controller 140.

The machine 100 may include one or more rollers 150. The rollers 150 may include one or more front roller(s) 152, back roller(s) 154, and theta roller(s) 156. It is noted that the machine 100 may include different or other rollers 150. In general, the rollers 150 may operatively align, clamp, and position (e.g., rotate, or otherwise move) the workpiece relative the table 120 and cutter head 130. For example, a user may place a workpiece on the table with a portion of the workpiece in between the various rollers 150. The controller 140 (or other component of machine 100) may operatively move or otherwise position one or more of the front roller(s) 152, back roller(s) 154, and theta roller(s) 156 to clamp the workpiece in an appropriate place. The theta roller(s) 156 may be coupled to a theta or driving motor. The controller 140 may operatively control the theta motor to rotate the workpiece while the cutter head 130 operatively mills the workpiece.

Figure 3A:
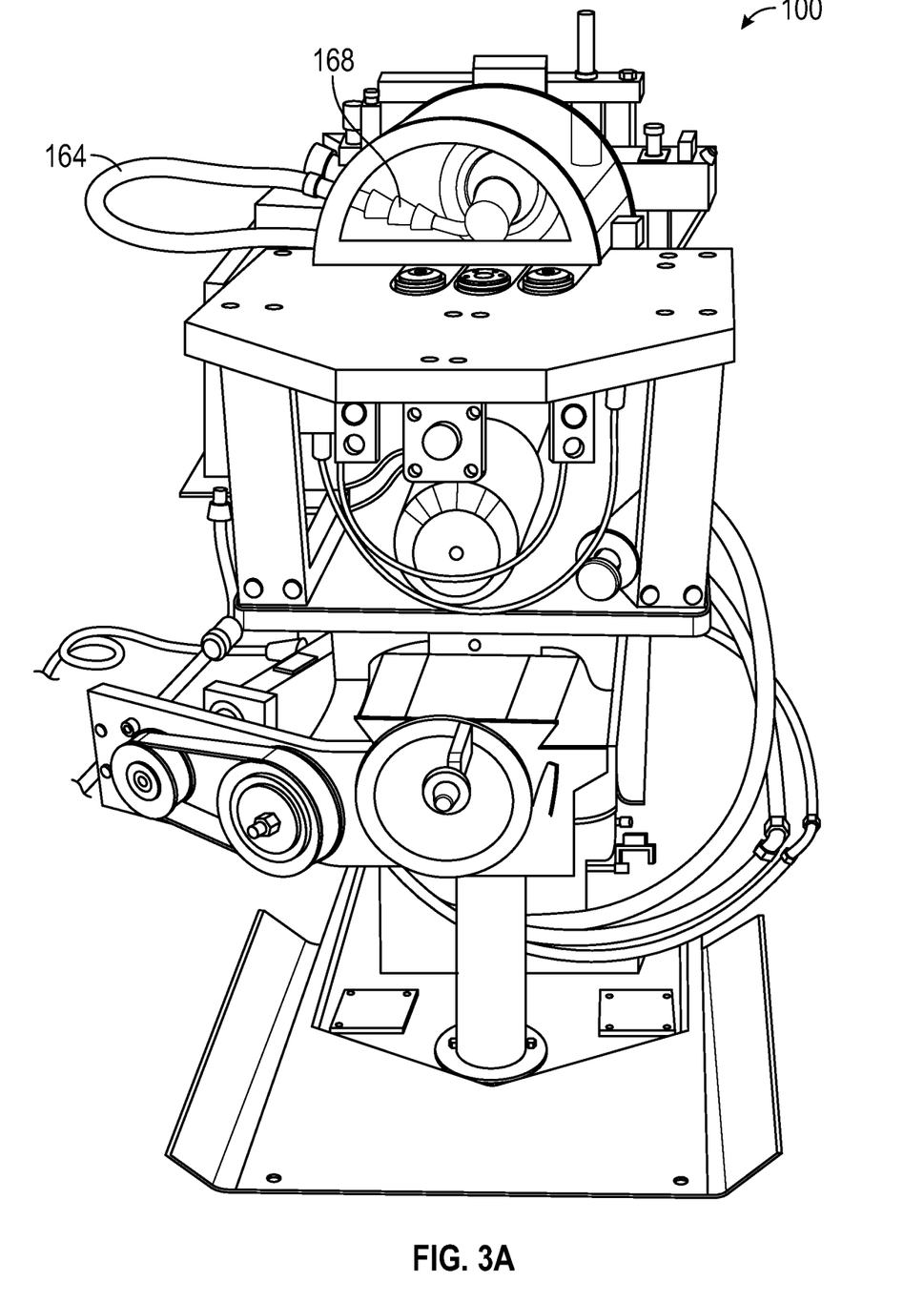
FIG. 3A illustrates an exemplary prototype of the machine of FIG. 1 in accordance with embodiments disclosed herein.
Figure 3B:
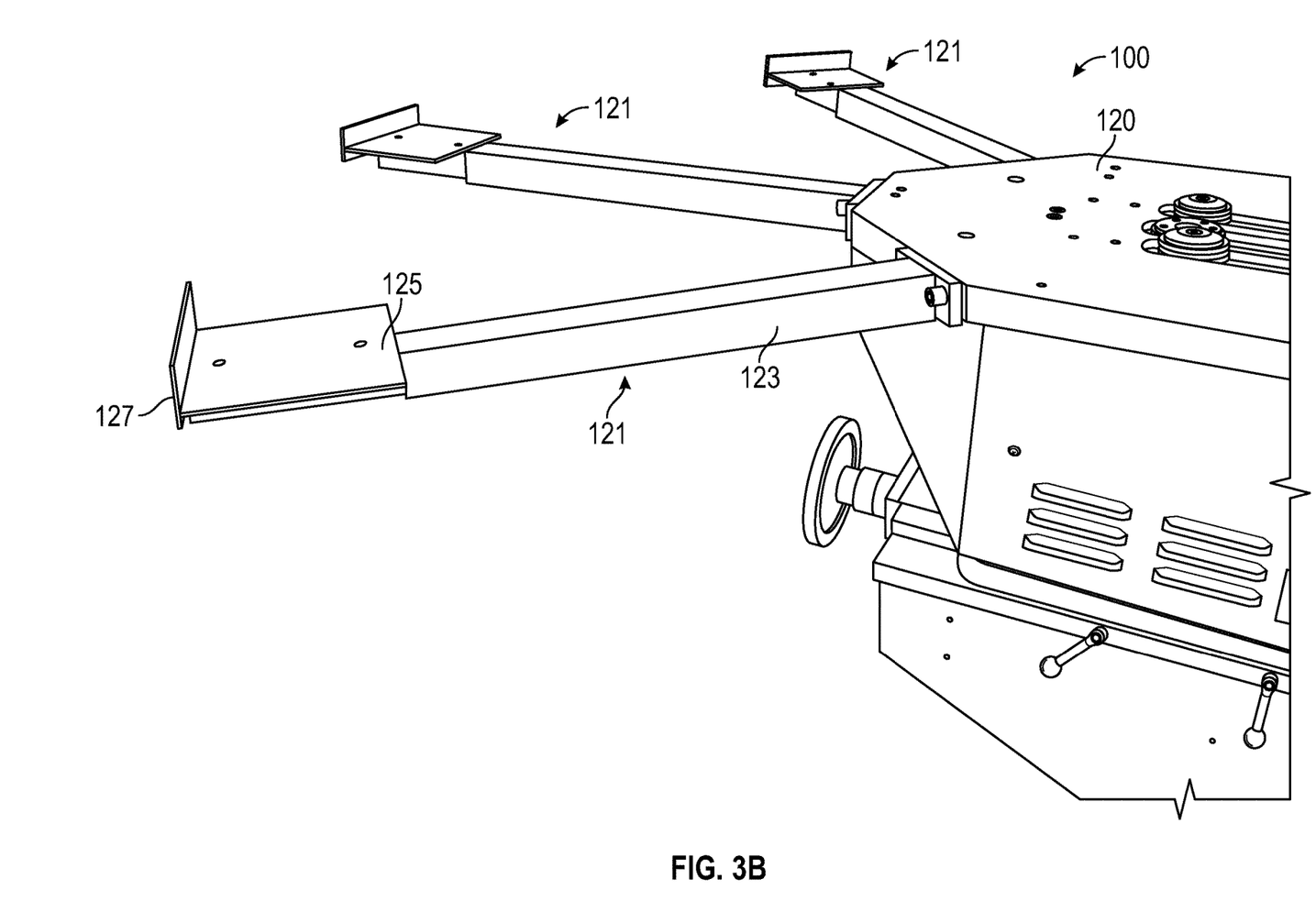
FIG. 3B illustrates support arms for the machine of FIG. 1 in accordance with embodiments disclosed herein.
Figure 3C:
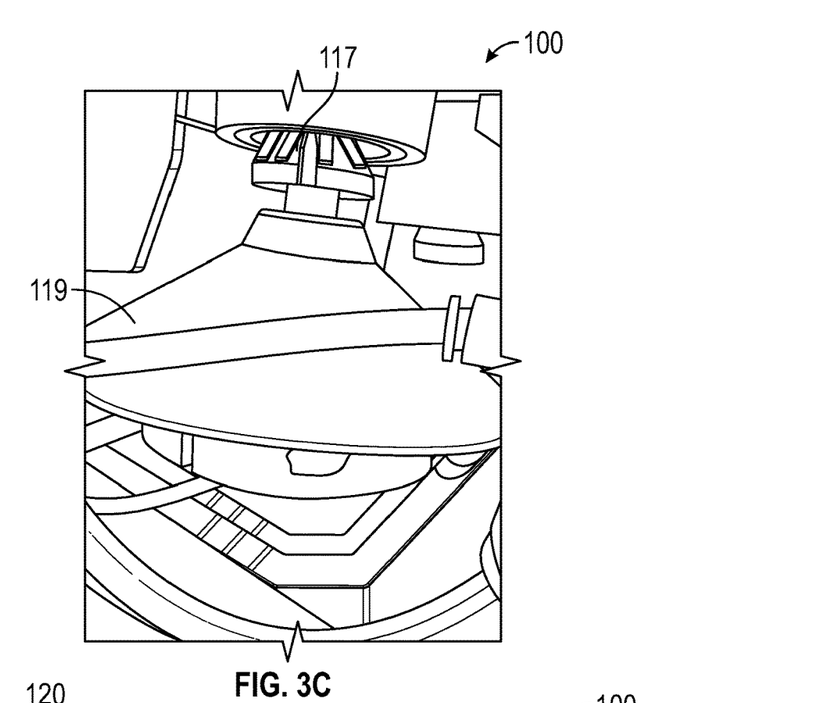
FIG. 3C illustrates a theta encoder shield of the machine of FIG. 1 in accordance with embodiments disclosed herein.
Figure 3D:
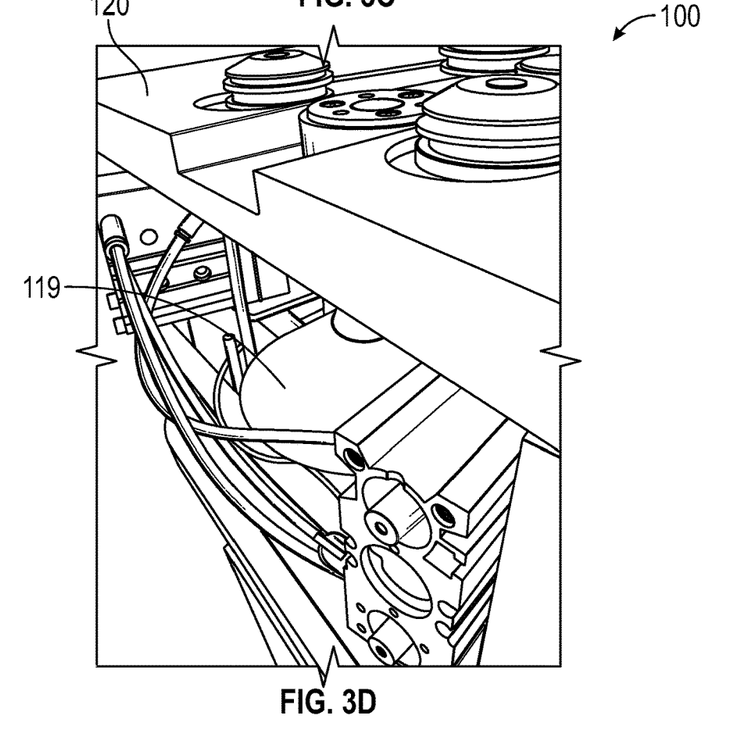
FIG. 3D illustrates another view of the theta encoder shield of FIG. 3C in accordance with embodiments disclosed herein.

As shown in FIGS. 3C and 3D, a theta encoder shield 119 may be disposed to operatively deflect shavings or other materials from contacting or otherwise interfering with a theta axis encoder as described herein. The theta encoder shield 119 may comprise a generally frustoconical shield disposed about a theta axis axle 117. The theta axis axle 117 operatively drives the theta roller(s) 156.

According to at least one embodiment, the machine 100 may include a safety guard 160. The safety guard 160 may comprise a shield that may prevent or reduce risk of injury to a user and/or prevent or reduce risk of materials from being ejected. In an aspect, the safety guard 160 may be comprised of a generally transparent or opaque material. This may allow a user to view the workpiece as it is milled. It is noted that the safety guard 160 may comprise various materials, such as plastics, glass, or the like.

The safety guard 160 may be selectively positionable in an operating position (as shown in FIG. 1) and an idle position (as shown in FIG. 2). In the operating position the safety guard 160 may be considered as "down," while the safety guard 160 may be considered as "up" in the idle position. As an example, the safety guard 160 may be hingedly secured to a portion of the base 110 such that it may move between the operating and idle positions. It is noted that the safety guard 160 may be manually or automatically moved between positions. In one example, the controller 140 automatically positions the safety guard 160 based on a state of the machine 100 as described herein. In another aspect, the controller 140 may determine a position of the safety guard 160 based on one or more sensors. Determining a position may include determining whether the safety guard 160 is in the up position, or determining whether or not the safety guard 160 is in the down position. For example, the controller 140 may receive input from a user to begin milling. The controller 140 may sense whether the safety guard 160 is in a down position. If it is not in the down position, the controller 140 may prevent operation of the cutter head 130. As such, the machine 100 may only need one sensor to determine the position of the safety guard 160.

Turning to FIG. 3A, there is an exemplary prototype of the machine 100. In at least some embodiments, as shown in FIGS. 1 and 3A-D, the machine 100 may include a vacuum 162. The vacuum 162 may include a hose 164, an inlet 168, and a motor (not shown). The inlet 168 may be disposed proximal the cutter head 130. During milling of a workpiece, the cutter head 130 removes material from the workpiece. The material may be removed in strips, small particles, or the like. The removed material may also become airborne. Disposition and operation of the vacuum 162 may gather or suck the material. As described herein, the vacuum 162 may be automatically controlled by the controller 140, manually controlled by a user, or both.

In one aspect, the inlet 168 may comprise a nozzle. The nozzle may extend from an internal wall of the safety guard 160. When the safety guard 160 is in the down position, the nozzle may be positioned proximal the cutter head 130, and when the safety guard 160 is in the up position, the nozzle may be positioned away from the cutter head 130. The hose 164 may comprise a flexible tube-shaped body. The flexibility of the hose 164 may allow for movement of the inlet 168 or other parts of the machine 100.

According to various embodiments, the inlet 168 may be disposed at various other locations. For instance, the inlet 168 and/or hose 164 may be disposed within the table 120, affixed in a position (e.g., on the table, on or within the base 110, etc.), and/or may be manually positionable. In an example, the hose 164 and/or inlet 168 may be detachable from the safety guard 160 so that a user may utilize the vacuum 162 with their hand.

Machine 100 may include an interface 170. The interface 170 generally comprises an input/output or I/O device that receives input from a user and may generate output to the user. In an example, the interface 170 may comprise a screen 172. The screen 172 may comprise an LCD screen, touch screen, or the like. In various embodiments, the interface 170 may comprise one or more of a keyboard, mouse (e.g., pointing device), joystick, remote controller, touch screen, stylus, button, LED indicator, cellular phone, tablet, speaker, microphone, or the like. It is noted that the interface 170 may be disposed on the base 110 or may be disposed at a separate workstation that is in communication with the machine 100 (e.g., the interface 170 may be remotely connected to the base 110). For instance, the interface 170 may be disposed at a separate workstation or in another remote location. In at least one embodiment, the interface 170 may be coupled with the controller 140 via a wired or wireless connection. Moreover, the interface 170 may comprise one or more devices that may be in communication with each other. For instance, the interface 170 may comprise screen 172, a keyboard, and/or one or more indicator lights.

It is noted that machine 100 may further include a cooling component that may operatively cool various portions of the machine 100 and/or a workpiece. For instance, a cooling component may cool one or more of the table 120, cutter head 130, rollers 150, or the like. The various components of machine 100 and/or a workpiece may be heated as the cutter head 130 cuts into a workpiece. The heat may be a result of friction from cutting, operation of the motor, or the like. As such, the cooling component may reduce the temperature of the components. It is noted that the cooling component may include a fan, a liquid cooling system, a heat sink, or other cooling system. In one aspect, the vacuum 162 may be utilized to suck hot air away from the cutter head.

FIG. 3B illustrates the machine 100 including one or more support arms 121. The support arms 121 may extend from the table 120 and may operatively support a kampprofile gasket as it is milled by the machine 100. It is noted that the machine 100 may comprise other or different numbers of support arms 121. In an embodiment, the machine 100 may comprise t support arms 121, where t is a number. The support arms 121 may generally comprise a body 123, a support plate 125 and a guide rail 127. The body 123 may be operatively attached to the table 120 via fasteners, threaded connections, adhesives, welding, or the like. The support plate 125 may comprise a generally flat surface that may be generally wider than the body 123. The guide rail 127 is disposed at a terminal end of the support arms 121. The guide rail 127 prevents the kampprofile gasket from becoming misaligned or falling off the support arms 121.

It is noted that the support arms 121 may be removably attached to the machine 100. In at least one embodiment, the support arms 121 may radially extend from the table 120. It is further noted that the support arms 121 may be adjustable in length to accommodate differently sized workpieces. In one or more embodiments, the support arms 121 may be manually adjustable or automatically (e.g., controlled by the machine 100 without requiring human adjustment) adjustable.

Figure 4:
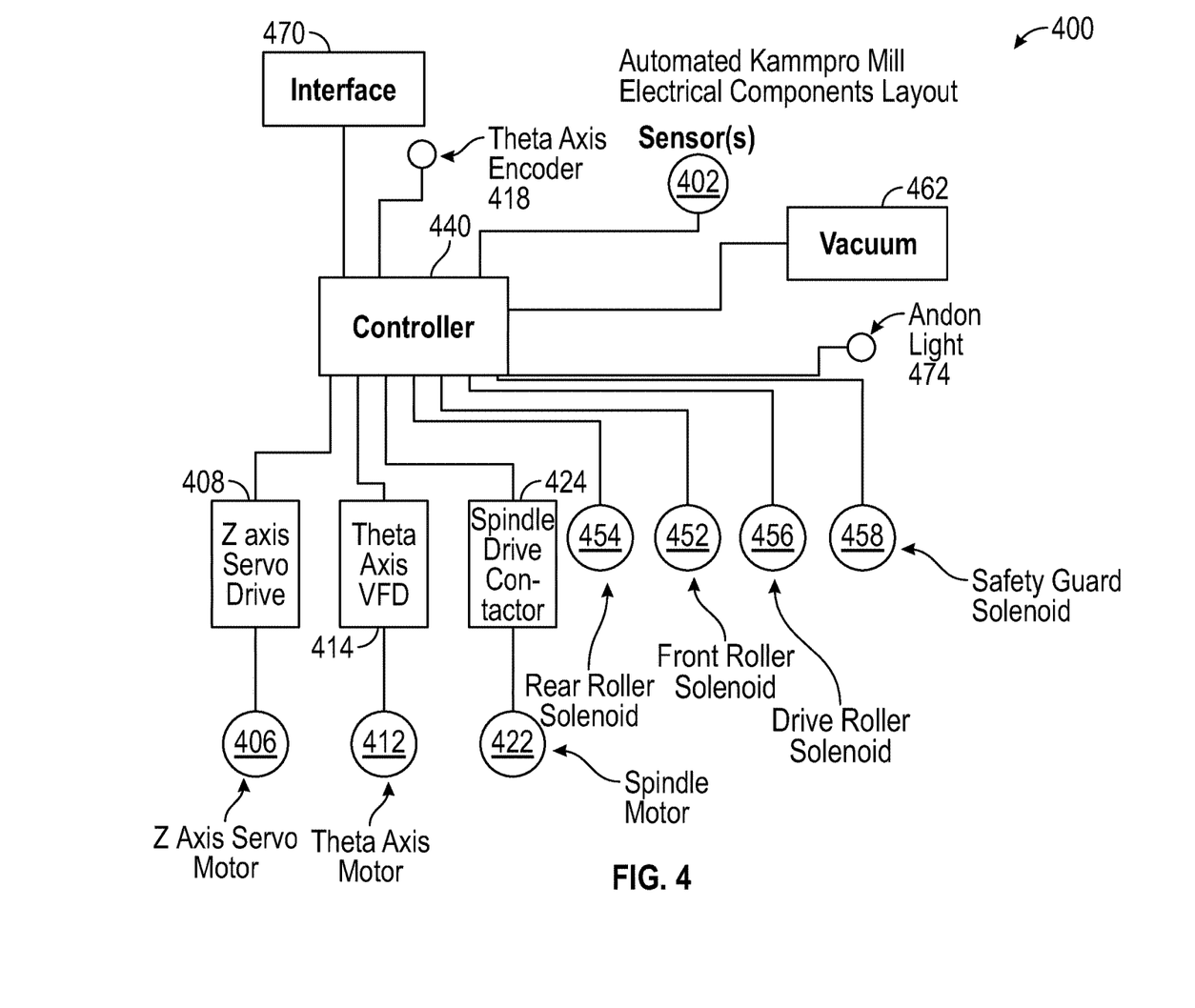
FIG. 4 is a functional block diagram of a gasket milling machine in accordance with embodiments disclosed herein.

Turning now to FIG. 4, with reference to FIGS. 1-3D, there depicted is a functional block diagram of at least a portion of a milling machine system 400 in accordance with various disclosed embodiments. Milling machine system 400 may comprise similar aspects as machine 100. For instance, milling machine 400 may include a controller 440 that may be similar to controller 140. It is noted that controller 400 may comprise a programmable logic controller that may include a memory and a processor. The memory may be configured for storing computer executable instructions and the processor may facilitate operation of the computer executable instructions. It is noted that system 400 may include one or more devices, such as one or more milling machines, network interfaces, or the like. It is further noted that one or more devices may comprise, at least in part, the various components of system 400. While shown as separate or distinct components, the components of system 400 may be comprised by one or more components.

System 400 may include an interface 470, which may be similar to interface 170. Interface 470 may receive input from a user and may be communicatively coupled to the controller 440 in order to provide the user input to the controller 440. In at least one embodiment, the interface 470 may receive input that identifies at least one of a measurement of a workpiece (e.g., diameter, thickness, length, width, etc.), a shape of a workpiece (e.g., rectangular, circular, etc.), a type of material, or other parameters associated with the workpiece. For instance, a user may measure the diameter and thickness of a kammprofile blank and may input the measurements into the interface 470. The user may also enter desired patterns or programs. For example, the user may enter a desired depth of cut for a workpiece. It is noted that certain parameters may be predetermined or set by an administrator. As an example, an operator may be milling a number of different gaskets to meet specified criteria (e.g., depth of cut). The specified criteria may be preset for milling of gaskets to reduce operator error and/or reduce the number of inputs required to be input by the operator.

In another aspect, the interface 470 may receive input from a user to begin milling of a workpiece. For instance, the user may place the workpiece in an appropriate position on a table of a milling machine and may enter parameters for milling, then press a button to start milling. The controller 440 may receive the command to start milling and may control one or more clamps to hold the workpiece in place. According to embodiments, the controller 440 may clamp the workpiece via one or more rollers (e.g., rollers 150). The controller 440 may position the one or more rollers via one or more motors, such as front roller solenoid 452, back roller solenoid 454, or theta/drive roller solenoid 456. In at least one example, the controller 440 actuates the theta/drive roller solenoid 456 to begin movement of a theta roller(s), then actuates the rear and front roller solenoids 452, 454. It is noted, however, that the controller 440 may actuate the various solenoids in any order. Moreover, the system 400 may include various other clamps, rollers, or the like. It is also noted that one or more of the clamps may comprise a manual override or manual control.

Additionally or alternatively, the controller 440 may actuate a safety guard (e.g., safety guard 160). For instance, the controller 440 may receive input from the user to begin a milling operation. The controller 440 may position the safety guard in a down position via a motor, such as safety guard solenoid 458. It is noted that the controller 440 may also be coupled with one or more sensors 402. The one or more sensors 402 may include a proximity sensor(s) (e.g., reed switches or the like) positioned to sense when the safety guard is up or down. In one embodiment, a single sensor is utilized to sense that the safety guard is down. If the sensor does not detect the safety guard in the down position, the controller 440 assumes the safety guard is up. In various other embodiments, multiple sensors are utilized to sense the safety guard in the down position and to sense the safety guard in the up position. It is noted that other types of sensors may be utilized to determine a location or position of a safety guard, such as a gyroscope, accelerometer, light-beam sensor, mechanical probe, Hall Effect sensors, capacitive transducers, etc.

As described herein, the controller 440 may prevent or allow operation of a cutter head based on the position of the safety guard. For instance, when the controller 440 determines that the safety guard is not in the down position, the controller 440 may prevent operation of the cutter head. Likewise, the controller 440 may allow operation of the cutter head when it determines that the safety guard is in the down position. It is noted that the controller 440 may control interface 470 and/or Andon light 474 to indicate a position of the safety guard or a status of the machine, such as whether the system 400 is in work, waiting on an operator for input, ready to run, or off. The Andon light 474 may comprise one or more colors of lights or patterns of operating lights (e.g., blinking, etc.) to indicate a status.

As described herein, the controller 440 may automatically position a table and workpiece for a milling operation. For instance, the user may place the workpiece in an appropriate position on a table of a milling machine and may enter parameters for milling. The controller 440 may automatically position the table relative the position of a cutter head. According to various disclosed embodiments, the controller 440 may adjust a position of the table in at least one of the X-, Y-, or Z-axis relative the cutter head. As the workpiece is clamped or held in place on the table, this also adjusts the position of the workpiece. In at least one embodiment, the user may manually control positioning in at least one of the at least one of the X-, Y-, or Z-axis directions. It is further noted that at least one of the at least one of the X-, Y-, or Z-axis may be fixed.

As an example, the system 400 may have a fixed position of the table and cutter head in the X-axis since this relative position does not need to be adjusted. The Y-axis may be manually adjusted by a user as the Y-axis may be set and may not change frequently between milling of different workpieces. Continuing with the above example, the controller 440 may automatically adjust the position of the table in the Z-axis. The controller 440 may adjust the position of the table via a Z-axis motor 406 connected to the controller 440 via a Z-axis drive 408. In an aspect, the Z-axis motor 406 may be any appropriate motor, such as a servomotor comprising a rotary actuator or linear actuator that allows for control of angular or linear position, velocity and acceleration. In another aspect, the Z-axis motor 406 may be coupled to a sensor or sensor(s) 402 to provide position feedback to controller 440. As such, controller 440 may identify a location of the table in the Z-axis and may operatively adjust the position of the table based on the location. In some embodiments, the position may be a binary position (e.g., up or down), and in other embodiments, the position may be a numerical value.

In embodiments, controller 440 may be coupled to a theta axis motor 412 via a theta axis drive 414. The controller 440 may operatively control theta axis motor 412 to drive the theta/drive roller(s) (e.g., theta roller(s) 156). The theta axis motor 412 operatively forces a workpiece to move about a machine table. In an example, the theta axis motor 412 may rotate a gasket as it is being milled. Theta axis motor 412 may be coupled with a theta axis encoder 418. The theta axis encoder 418 monitors the axis motor 412 and may determine how many revolutions the axis motor 412 has to spin in order to revolve a gasket around. For instance, the theta axis encoder 418 may be positioned around a shaft of the axis motor 412 and may determine the number of revolutions the motor has made. The theta axis encoder 418 (and/or the controller 440) may utilize this information with the known diameter of a workpiece to determine when or how many revolutions the axis motor 412 must make to completely revolve the workpiece.

In another example, the controller 440 may operatively control a spindle motor 422 coupled to the controller 440 via a spindle drive 424. The spindle motor 422 may be coupled to a cutter head (e.g., cutter head 130) that may cut or mill a workpiece. In an aspect, the controller 440 may operatively change the relative positions of the table and the cutter head so that the cutter head contacts a workpiece disposed on the table.

As described herein, the controller 440 may adjust the position of the table via the Z-axis motor 406. In at least some embodiments, the controller 440 may be coupled to another motor that may move the cutter head in the Z-axis. The controller 440 determines where to initially position the table relative the cutter head based on a known thickness of a workpiece and may appropriately adjust the position. In an example, the operator inputs ring thickness and diameter in the interface 470, and system 400 self adjusts for the thickness and takes off a set amount of material for every cut. The machine may make several passes and will know the cut depth of each pass. For instance, the machine may self-reference every cycle at a known location. This allows the machine to control the depth of cuts.

When the cutter head is in position and is rotating, it removes material from a workpiece. The cutter head cuts a set depth into the workpiece. Thus, when a gasket is being milled, the gasket is rotated so that the cutter head cuts a certain depth into the gasket for one rotation. After one rotation, the cutter head is repositioned in the Z-axis relative the table so that the cutter head cuts further into the gasket. For instance, a single cut may slice a depth of m units into the gasket. On the next cut, the cutter head cuts another m unit into the gasket so that the total cut depth is now twice m. In the past, this depth of cut had to be manually controlled. The described embodiments may automatically control the depth of the cut as described herein.

As the cutter head is rotated by the spindle motor 422 to cut into a workpiece, the theta axis motor 412 drives the workpiece past the cutter head, which may be stationary in the X-axis and the Y-axis. The theta axis encoder 418 monitors the theta axis motor 412 and determines when the workpiece has been moved a set amount, such as when the workpiece has been fully rotated. As described above, the controller 440 determines when the workpiece has been fully revolved by comparing input from the theta axis encoder 418 with the diameter of the workpiece. When the controller 440 determines that the workpiece has revolved, it then adjusts the position of the cutter head (e.g., either through moving the table or the cutter head in the Z-axis) so that the next pass of the cutter head also cuts into the workpiece. This may continue until a desired total depth of cut is reached. It is noted that the total depth of cut may be based on a program parameter that is input by a user into interface 470. It is also noted that the controller 440 determines when to stop the spindle motor 422 and theta axis motor 412.

In at least one embodiment, the system 400 includes a safety guard motor 458, such as a solenoid. The controller 440 operatively controls the safety guard motor 458 to position a safety guard (e.g., safety guard 160) in one or more positions. According to one example, the controller 440 may move the safety guard to a down position prior to driving the spindle motor 422 and may move the safety guard to an up position after driving the spindle motor 422. It is noted that the controller 440 may be coupled with a proximity sensor of sensor(s) 402 to determine the position of the safety guard. In at least one embodiment, the controller 440 may output a state of the safety guard via the interface 470 and/or Andon light 474. As an example, the controller 440 may notify a user when the safety guard is down or up. If in the up position, the controller 440 may prevent operation of the spindle motor 422 and may indicate such to the user.

It is also noted that the system 400 may include a vacuum 462 coupled to the controller 440. Controller 440 may selectively turn the vacuum 462 on and off based on whether the spindle motor 422 is in operation. For instance, the controller 440 may turn the vacuum 462 on while the spindle motor 422 is on, and may turn the vacuum 462 off when the spindle motor 422 is switched off. In some embodiments, the controller 440 may leave the vacuum 462 on for a short period of time after the spindle motor 422 is turned off.

As described here and elsewhere in the specification, system 400 may include sensor(s) 402. The sensor(s) 402 may include one or more proximity sensors, optical beams, manual probes, or the like. The sensor(s) 402 may be appropriately positioned to make sure a component of system 400 is present and/or is operative. The sensor(s) 402 may be coupled with the controller 440. Some envisioned sensors include, sensors to determine when a workpiece is present, sensors to determine when a workpiece is vibrating, stuck or otherwise malfunctioning, sensors to measure a temperature of the cutter head, workpiece, or the like, sensors to measure a diameter of a workpiece, sensors to measure a shape of the workpiece, sensors to measure the thickness of the workpiece, or the like. In another aspect, the sensor(s) 402 may include temperature sensors. The controller 440 may utilize the temperature sensors to monitor for overheating of a machine or workpiece, controlling a cooling component, or the like.

In an example, some embodiments of system 400 may include one or more sensors that automatically measure the diameter of a workpiece via optical recognition. For example, a camera or other optical device may monitor the workpiece as it is milled. The camera may recognize cuts in the workpiece. The camera may be in a fixed location and/or may recognize when a cut reaches a marker disposed on the table. The camera may send the information to the controller 440. The controller 440 correlates the recognized images with information received from the theta axis encoder 418. As an example, the controller 440 may calculate how many revolutions of theta axis motor 412 were required to revolve the workpiece to a position where the cuts can be recognized. Based on this information, the controller 440 may determine the diameter of the workpiece and/or the number of revolutions of theta axis motor 412 required to completely revolve the workpiece.

In another example, the system 400 includes one or more sensors that may be utilized to sense a thickness of the workpiece, such as a probe or the like. Additionally or alternatively, the controller 440 may touch off the workpiece with a cutter head to positively index the cutter head position. The controller then references the position of the table via the Z-axis motor 406. Based on this information, the controller 440 determines the thickness of the workpiece.

Figure 5:
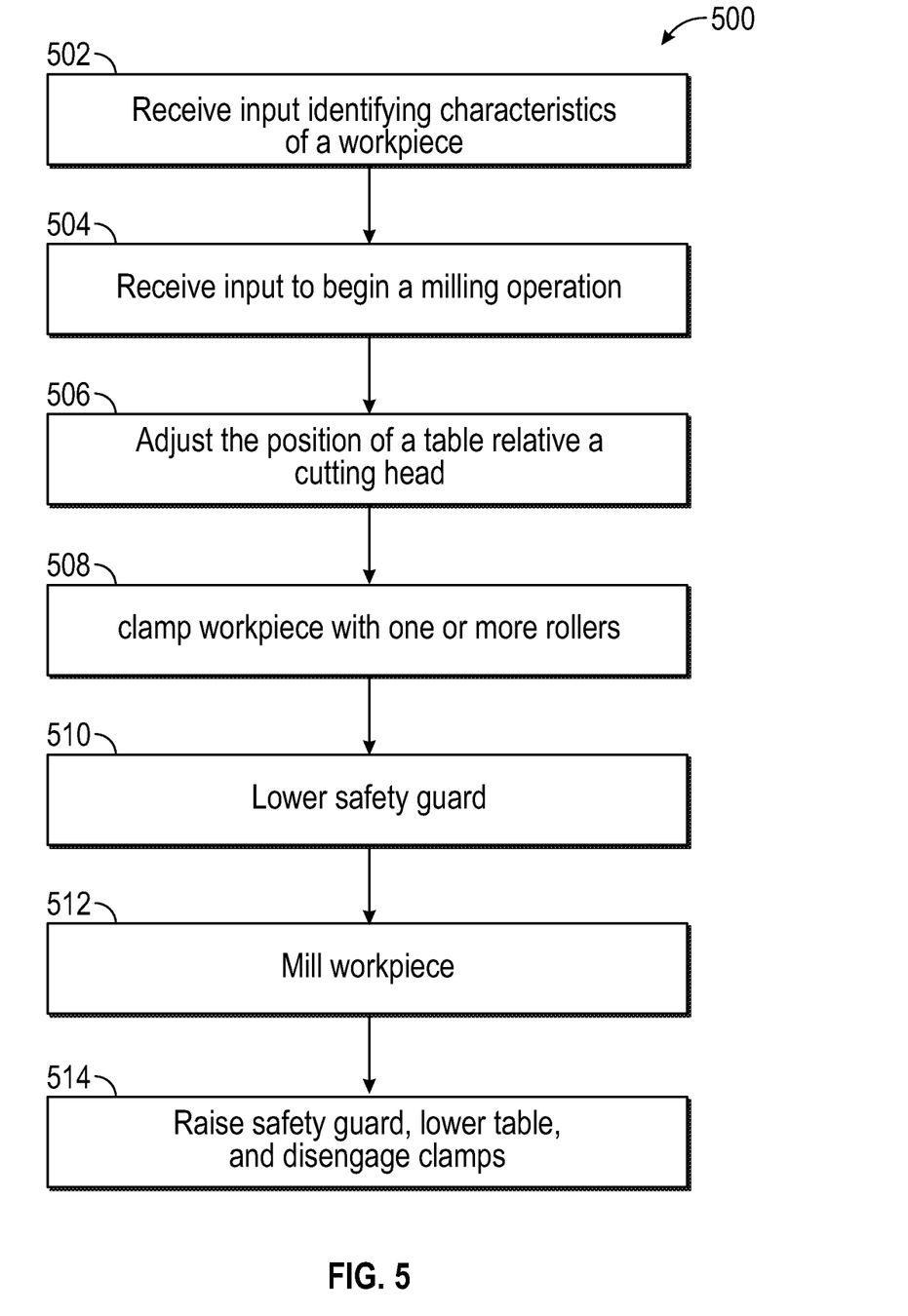
FIG. 5 illustrates an exemplary method of manufacturing a gasket including automatically controlling movement of a machine in an axis in accordance with embodiments disclosed herein.
Figure 6:
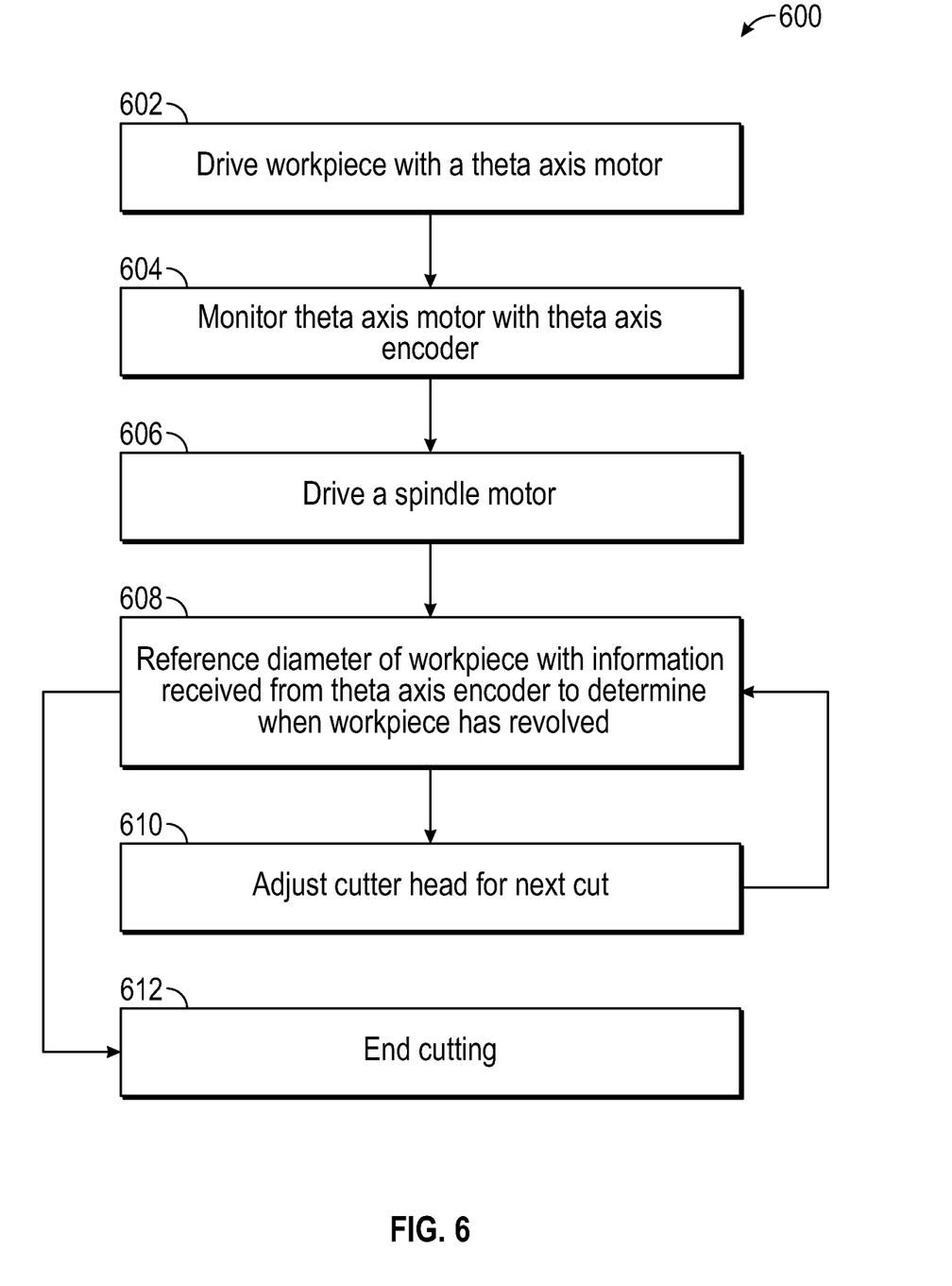
FIG. 6 illustrates an exemplary method of manufacturing a gasket including adjusting a cutter head in accordance with embodiments disclosed herein.

In view of the subject matter described herein, methods that may be related to various embodiments may be better appreciated with reference to the flowchart of FIGS. 5 and 6. While the methods are shown and described as a series of blocks, it is noted that associated methods or processes are not limited by the order of the blocks unless context suggests otherwise or warrants a particular order. It is further noted that some blocks and corresponding actions may occur in different orders or concurrently with other blocks. Moreover, different blocks or actions may be utilized to implement the methods described hereinafter. Various actions may be completed by one or more of users, mechanical machines, automated assembly machines (e.g., including one or more processors or computing devices), or the like.

FIG. 5 is a flow chart of an exemplary method 500 of milling a gasket with an automatic milling machine or system (e.g., machine 100, system 400, etc.) as described herein. The method 500 may be utilized to manufacture a kammprofile gasket.

At 502, a system may receive input identifying one or more characteristics of the workpiece. For instance, a user may manually measure a diameter, a thickness, or the like of a workpiece. The user may input the measurements into an interface. In another example, the system may automatically take measurements of the workpiece via input from one or more sensors. The user may place the workpiece on a table or other cutting surface.

At 504, the system may receive input to begin a milling operation. In embodiments, after the user places the workpiece on the table, the user may interact with an interface to start the milling operation. For instance, the user may touch a touch screen, press a button, or interact with another I/O device.

At 506, the system adjusts the position of the table relative the cutter head. As described herein, the system may adjust the position of the table in one or more the X-axis, Z-axis, or Y-axis. In an example, the user may manually control the Y-axis and the system may automatically control the Z-axis. The system, likewise, may position the table based on the thickness of the workpiece. For instance, the system may raise the table in the Z-axis higher for thinner workpieces and may raise the table a lower degree for thicker workpieces.

At 508, the system may clamp the workpiece with one or more rollers. For instance, the system may actuate one or more solenoids to close one or more rollers together. The system may clamp the workpiece with enough force to generally prevent the workpiece from moving in the Z-axis while allowing rotation in the theta axis. It is noted that any number of clamps may be utilized. In one example, the system may utilize a front roller clamp, a back roller clamp, and a theta/drive roller clamp. The clamps may be closed in any order, such as the theta/drive roller clamp followed by the front and back roller clamps.

At 510, the system may lower a safety guard to guard a user from injury. It is noted that the safety guard may be lowered at other times, such as before clamping or before adjusting the position of the table.

At 512, the system may mill the workpiece. This may include driving a spindle motor as described herein. Details of a milling process are described in more detail herein, with reference to FIG. 6.

At 514, the system may complete the milling process and may rest various components for the next milling operation. For instance, the system may raise the safety guard, lower the table and disengage clamps. In another aspect, the system may prompt a user to flip the workpiece for milling on another side of the workpiece. Accordingly, the system may iterate various actions for milling by continuing to reference number 504. It is noted that the system may bypass receiving input regarding the characteristics when milling a second side of the workpiece.

FIG. 6 is a flow chart of an exemplary method 600 of milling a workpiece as described herein. It is noted that the method 600 may include various aspects disclosed with reference to the other figures. Prior to reference number 602, a workpiece is on a table of a milling machine, and the machine has positioned the table relative the cutter head.

At 602, a system drives the workpiece with a theta axis motor. For instance, the axis motor may cause one or more spindles to rotate. The spindles, in turn, push the workpiece so that it revolves. It is noted that other motors may be utilized to drive the workpiece.

At 604, the system may monitor the theta axis motor with a theta axis encoder. The theta axis encoder may be disposed about a shaft of the motor and may monitor rotations of the shaft. In an aspect, the theta axis encoder may communicate information to a controller.

At 606, the system may drive a spindle motor to cause rotation of a cutter head attached to a shaft of the spindle motor. The cutter head operatively cuts into a workpiece. It is noted that the cutter head may comprise multiple cutting edges so that multiple cuts are made in the workpieces simultaneously. As the cutter head cuts the workpiece, the theta axis motor revolves the workpiece to feed it to the cutter head.

At 608, the system may reference the diameter of a workpiece with information received from the theta axis encoder to determine when a workpiece has revolved. For instance, the theta axis encoder may monitor a theta axis motor to determine a number of rotations of the shaft of the theta axis motor. The theta axis motor may communicate the number of rotations to a central controller. The controller may calculate a representation of an amount of revolutions (e.g., percentage of revolutions, distance in units, etc.) of a gasket based on the number of rotations. For instance, k revolutions of the motor shaft may be determined to be h revolutions of the gasket. It is noted that the controller may utilize the diameter of the gasket (which may be based on user input or sensed by the machine) to determine the amount of revolutions of the gasket.

In some embodiments, the system may reference the diameter of the workpiece with other information such as an amount of time that a theta/driving motor has run. The controller may determine whether the workpiece has been revolved based on calculating a distance of travel with the known run time and operating speed of the motor.

At 610, the system may adjust the cutter head for the next cut. For instance, the system may determine that the gasket has been revolved by 360 degrees. Thus, the system may lower the cutter head by a predetermined amount. This allows the next cut pass to add further depth into cuts. After the cutter head is adjusted, the method may continue to reference 608. It is noted that the system may determine when a target depth of cut has been reached and may end a cutting process at 612.

Various aspects described herein may employ logic. "Logic" refers to any information and/or data that may be applied to direct the operation of a processor. Logic may be formed from instruction signals stored in a memory (e.g., a non-transitory memory). Software is one example of logic.

In another aspect, logic may include hardware, alone or in combination with software. For instance, logic may include digital and/or analog hardware circuits, such as hardware circuits comprising logical gates (e.g., AND, OR, XOR, NAND, NOR, and other logical operations). Furthermore, logic may be programmed and/or include aspects of various devices and is not limited to a single device.

As used herein, terms such as "access point," "server," and the like, are utilized interchangeably, and refer to a network component or appliance that serves and receives control data, data-streams or signaling-stream. Data and signaling streams may be packetized or frame-based flows. Furthermore, the terms "user," "operator," and the like are employed interchangeably throughout the subject specification, unless context suggests otherwise or warrants a particular distinction among the terms. It is noted that such terms may refer to human entities or automated components supported through artificial intelligence (e.g., a capacity to make inference).

A network typically includes a plurality of elements that host logic. In packet-based wide-area networks (WAN), servers (e.g., devices comprising logic) may be placed at different points on the network. Servers may communicate with other devices and/or databases. In another aspect, a server may provide access to a user account. Embodiments may utilize substantially any wired or wireless network. For instance, embodiments may utilize various radio access networks (RAN), e.g., Wi-Fi, global system for mobile communications, universal mobile telecommunications systems, worldwide interoperability for microwave access, enhanced general packet radio service, third generation partnership project long-term evolution (3G LTE), fourth generation long-term evolution (4G LTE), third generation partnership project 2, BLUETOOTH®, ultra mobile broadband, high speed packet access, xth generation long-term evolution, or another IEEE 802.XX technology. Furthermore, embodiments may utilize wired communications.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define embodiments disclosed herein. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An automatic milling machine comprising:
a controller;
a cutter head for milling a kammprofile gasket and operatively controlled by the controller;
a table operatively supporting a workpiece; and
a driving motor that operatively moves the workpiece relative the cutter head by rotating a theta roller that contacts and rotates the workpiece, wherein the controller operatively monitors the relative position of the cutter head and the table, and adjusts the position of the table based at least in part on operation of the driving motor.

2. The automatic milling machine of claim 1, further comprising a user interface coupled to the controller, wherein the user interface receives dimensions of a workpiece.

3. The automatic milling machine of claim 2, wherein the user interface comprises a touch screen monitor.

4. The automatic milling machine of claim 2, wherein the controller adjusts the relative position of the cutter head and the table based at least in part on operation of the driving motor and the dimensions of the workpiece.

5. The automatic milling machine of claim 1, wherein the controller operatively adjusts the position of the table by moving the table in one or more axes.

6. The automatic milling machine of claim 1, wherein the controller operatively adjusts the position of the cutter head by moving the cutter head in one or more axes.

7. The automatic milling machine of claim 1, further comprising a safety guard disposed proximal the cutter head.

8. The automatic milling machine of claim 7, wherein the controller operatively adjusts the position of the safety guard based on a state of the automatic milling machine.

9. The automatic milling machine of claim 1, further comprising a manual control that manually adjusts the position of the table.

10. The automatic milling machine of claim 1, further comprising at least one front roller or at least one back roller.

11. The automatic milling machine of claim 10, wherein the controller operatively positions at least one of the at least one front roller, the at least one back roller, or the theta roller to operatively clamp the workpiece.

12. The automatic milling machine of claim 1, further comprising a Z-axis motor operatively driving the table.

13. An automatic milling machine comprising:
a controller comprising a processor;
a cutter head and a cutting head motor, wherein the controller operatively controls the cutter head to mill a kammprofile gasket;
a table and a table motor, wherein the table motor operatively positions the table and wherein the table operatively supports a workpiece;
one or more front rollers and one or more back rollers, wherein the one or more front rollers and one or more back rollers are each rotatable about a respective axis, wherein at least one of the one or more front rollers or at least one of the one or more back rollers are movable along another axis to clamp the workpiece; and
a driving motor for driving a theta roller that operatively rotates the workpiece to pass the workpiece along the cutter head,
wherein the controller operatively monitors the relative position of the cutter head and the table, and adjusts the relative position based at least in part on operation of the driving motor.

14. The automatic milling machine of claim 13, wherein the controller operatively determines an amount of revolutions of the workpiece.

15. The automatic milling machine of claim 13, wherein the controller operatively determines the amount of revolutions of the workpiece based on operation of the driving motor.

16. The automatic milling machine of claim 13, wherein the controller operatively controls the driving motor and the cutting head to make at least two cutting passes on the workpiece.

* * * * *